United States Patent Office 3,271,465
Patented Sept. 6, 1966

3,271,465
PREPARATION OF CHLOROALKYLATED BENZENES AND ALKYLSUBSTITUTED BENZENES
William A. Krewer, Arlington Heights, and George W. Ayers, Chicago, Ill., assignors, by mesne assignments, to Union Oil Company, of California, Los Angeles, Calif., a corporation of California
No Drawing. Filed Nov. 30, 1962, Ser. No. 241,175
9 Claims. (Cl. 260—651)

This invention relates to a process for the haloalkylation of organic substances having one or more replaceable hydrogen atoms by reaction with sulfur compounds containing halogen, that is, certain sulfur halide and oxyhalide compounds, and formaldehyde, s-trioxane, or paraformaldehyde in the presence of a hydrogen halide, and to products of such process.

More particularly, this invention relates to a method of reacting an aromatic hydrocarbon such as toluene with certain sulfur halide and oxyhalide compounds and s-trioxane or paraformaldehyde in the presence of hydrogen chloride to produce a mixture of ortho- and para(chloromethyl)toluene, which product is readily oxidized to a mixture of orthophthalic and terephthalic acids.

A feature of this invention is the discovery that sulfur monochloride, sulfur dichloride, thionyl chloride, and sulfuryl chloride are useful agents in haloalkylation or chloromethylation reactions. In accordance with this invention, it has been found that sulfur monochloride, sulfur dichloride, and thionyl chloride or sulfuryl chloride and s-trioxane or paraformaldehyde, though not as selective in chloromethylation as phosphorus oxychloride and s-trioxane or paraformaldehyde, nevertheless produce a mixture of isomers from which useful concentrations of orthophthalic and terephthalic acids can be prepared.

In another aspect of this invention, complex sulfur-containing aromatic materials of petroleum origin have been found to produce useful halomethylated products when subjected to the action of sulfur monochloride, sulfur dichloride, thionyl chloride or sulfuryl chloride and s-trioxane or paraformaldehyde in the presence of a halogen acid. In particular, about one mole of hydrocarbon apparently reacts with about one mole of formaldehyde (from s-trioxane or paraformaldehyde) and one-half mole of sulfur monochloride, sulfur dichloride, thionyl chloride or sulfuryl chloride to yield the chloromethylated hydrocarbon and other products including elementary sulfur, sulfur dioxide or sulfuric acid.

Accordingly, it becomes a primary object of this invention to provide a novel method of haloalkylation of organic substances.

Another object of this invention is to provide a method for chloromethylating organic substances.

An object of this invention is to provide a method of chloromethylating aromatic compounds and derivatives thereof by reaction with certain sulfur halide or oxyhalide compounds and formaldehyde, s-trioxane or paraformaldehyde in the presence of a hydrogen halide, and the products of such process.

A further object of this invention is to provide a process of chloromethylating toluene by reaction with sulfur monochloride, sulfur dichloride, thionyl chloride or sulfuryl chloride and s-trioxane or paraformaldehyde to produce chloromethylated products having the chloromethyl group in the ortho and para positions from which useful concentrations of orthophthalic and terephthalic acids can be prepared.

These and further objects of the invention will become apparent or be described as the specification proceeds.

It is known in the art that simple aromatic compounds, such as benzene and naphthalene, can be chloromethylated with formaldehyde, formalin, or paraformaldehyde in the presence of aqueous hydrogen chloride, hydrogen chloride with zinc chloride, sulfuric acid, acetic acid, stannic chloride and syrupy (85%) phosphoric acid. With some compounds no catalyst is required and chloromethylether may be used in place of formaldehyde and hydrogen chloride.

The chloromethylation reaction, as is known in the art and as applied in this invention, involves the replacement of a hydrogen atom on a cyclic nucleus of aromatic character by a chloromethyl group in a single operation. The classic example is that of Grassi and Maselli (Gazz. Chim. Ital., 28, II, p. 477 (1898)) wherein the reaction of benzene, hydrogen chloride and paraformaldehyde in the presence of zinc chloride is shown as follows:

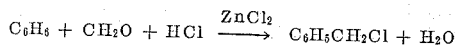

$$C_6H_6 + CH_2O + HCl \xrightarrow{ZnCl_2} C_6H_5CH_2Cl + H_2O$$

The reaction of this invention is carried out using the techniques and general reaction conditions for chloromethylation as are known in the art. In applying the reaction using sulfur monochloride ($S_2Cl_2$) sulfur dichloride ($SCl_2$) thionyl chloride ($SOCl_2$) or sulfuryl chloride ($SO_2Cl_2$), we have found further that the temperature preferably should be in the range of about 60°–85° C. but may be as high as 150° C. The reaction of this invention can be carried out at atmospheric, subatmospheric or superatmospheric pressures.

The sulfur compounds containing halogen used in accordance with this invention include sulfur monochloride ($S_2Cl_2$), sulfur dichloride ($SCl_2$), thionyl chloride ($SOCl_2$), and sulfuryl chloride ($SO_2Cl_2$). Thionyl chloride and sulfuryl chloride are oxyhalides of sulfur. For simple aromatic compounds such as benzene, toluene, naphthalene and the like, sulfur monofluoride ($S_2F_2$) may be used; however, since this latter compound has a boiling point of $-38°$ C. the application of pressure is necessary at reaction temperature. Mixtures of any of the foregoing sulfur halides or oxyhalides as for example, a mixture of sulfur monochloride and sulfur dichloride, can be used in the process.

Although approximately ½ mole of sulfur halide per mole of hydrocarbon and per mole of formaldehyde unit are preferred in the reaction, a larger or smaller quantity of hydrocarbon and/or formaldehyde unit may be used. In those instances where the aromatic hydrocarbon being chloromethylated is a liquid, still larger proportions of hydrocarbon may be used as a solvent during the reaction.

The recovery of the halomethylated aromatic products of the reaction may follow the known procedures of the prior art. A preferred procedure is to wash the reaction product with water containing 10 to 15% of sodium bicarbonate, and finally to water wash the product and subject same to fractional distillation. In some cases the halomethylated aromatic product can be distilled directly from the products of the reaction.

In addition to hydrogen chloride, other hydrogen halides, such as hydrogen iodide and hydrogen bromide, can be used. The purpose of the hydrogen halide is to moderate the reaction and to make the reaction proceed more smoothly. Experiments have demonstrated that gaseous hydrogen chloride itself is not a substitute for the sulfur monochloride or other sulfur halides and oxyhalides used in the instant process.

The starting material to be treated in accordance with this invention includes any aromatic organic compound having one or more replaceable hydrogen atoms attached to a nucleus, for example, a nucleus in an aromatic or heterocyclic ring having aromatic properties. Included in this category are mononuclear aromatics, dinuclear aromatics, trinuclear aromatics, tetranuclear aromatics, pentanuclear aromatics, heterocyclics with aromatic properties, condensed alicyclic-aromatics, and condensed heterocyclic-aromatics or polyheterocyclics with aromatic properties. Suh aromatic organic starting materials may contain substituent groups such as halogen, nitro, sulfonic acid, alkyl, aralkyl, amyl, biphenyl, butoxy, butyl, sec-butyl, t-butyl, caproyl, capryl, cetyl, cresoxy, cresyl, cyano, cyclobutyl, cyclohexyl, cyclopentyl, cyclopropyl, decyl, dodecyl, ethoxy, ethyl, heptyl, hydroxy, isobutoxy, isobutyl, methoxy, methyl, naphthoxy, naphthyl, octyl, phenethyl, phenoxy, propoxy, propyl, toloxy, tolyl, and xylyl. The number of halomethyl groups attaching to the organic starting material in accordance with the reaction is usually one and may be rarely as high as 3 except in the case where more than one aromatic ring is present in the organic molecule which is susceptible to chloromethylation.

Examples of aromatic organic starting materials having one or more replaceable hydrogen atoms are benzene, naphthalene, phenanthrene, anthracene, chrysene, hydrindene, perylene, pyrene, thiophene, pyrrole, pyrazole, pyridine, benzothiophene, dibenzothiophene, indole, Tetralin, quinoline, isoquinoline, acridine, and a large number of their substitution products. With the substitution products of the aforesaid compounds at least one replaceable hydrogen atom must remain for chloromethylation to take place. As seen from these examples, the organic starting material may be carbocyclic or heterocyclic in nature.

Other specific examples of starting materials include highly aromatic solvent extracts obtained in the solvent extraction of mineral lubricating oils using a solvent selective for aromatic compounds, and other highly aromatic products or by-products of industry, such as the intermediate fraction (BR 280°–442° F.), the dodecylbenzene fraction (BR 535° to 603° F.) generally used for detergent manufacture, and the post dodecylbenzene fraction (BR 647° to 779° F.) obtained by the fractional distillation of the product obtained by the alkylation of benzene by propylene tetramer, using hydrofluoric acid or anhydrous aluminum chloride as the catalyst. The intermediate fraction generally contains mixed $C_3$–$C_{11}$ alkyl-substituted benzene, the dodecyl fraction predominates in $C_{12}$ alkyl benzene and the post dodecyl benzene fraction is a mixture of higher alkyl benzenes. A preferred starting material, because it yields a halomethylated product from which economical yields of terephthalic acid can be prepared by oxidation, is toluene.

In order to illustrate the invention the following examples are given.

*Example I*

In a three-neck flask equipped with a mechanical stirrer, dropping funnel, gas inlet tube, and condenser, were placed 82.8 grams of toluene (0.9 mole), and 30 grams of paraformaldehyde (1 mole on the $CH_2O$ basis). A stream of hydrogen chloride was passed through the stirred mixture while the temperature was brought to 60° C. by means of a Glas-Col heater. Passage of the stream of hydrogen chloride and stirring of the mixture were continued while 61 grams of sulfur monochloride (0.45 mole) was added over a period of 45 minutes. The temperature gradually rose to 84° C. The stirring was continued for another 15 minutes, and then the mixture was cooled, an equal volume of toluene was added and the hydrocarbon layer which separated was washed with water, with saturated sodium bicarbonate solution and then again with water, and the washed product finally was dried over anhydrous calcium chloride. Upon distillation, it yielded 7.4 grams of chloromethylated toluene. The bottoms from the distillation was a reddish-black liquid of slightly unpleasant odor and contained a large amount of elemental sulfur.

A mixture of three grams of the chloromethylated toluene, 15 grams of potassium permanganate in 250 cc. of water and a few drops of sodium hydroxide solution was heated under reflux for 6 hrs. The hot solution was then made slightly alkaline by the addition of sodium hydroxide, heated and finally filtered. The filtered solution was acidified with hydrochloric acid and the precipitated organic acid was filtered hot and washed with successive portions of hot water until all orthophthalic acid had been dissolved from the mixture of acids. The yield of dry terephthalic acid (insoluble in hot water) was 1.5 grams. The hot-water washings were concentrated to a small volume and cooled in an ice bath to precipitate the orthophthalic acid. The yield of orthophthalic acid thus obtained was 1.4 grams. The ratio of ortho to para isomer was 0.93.

*Example II*

An experiment similar to Example I was carried out, except that no sulfur monochloride was used. No chloromethyltoluene was formed. This shows that the chloromethylation that occurred in Example I was not due to the hydrogen chloride used in the example, but that the sulfur monochloride was a necessary reactant.

*Example III*

Another experiment was carried out similarly to Example I except that 107 grams of thionyl chloride (0.9 mole) was added dropwise in place of the sulfur monochloride over a period of 52 minutes, while the temperature ranged from 77° to 84° C. The stirring was continued another 8 minutes. The reaction products were cooled and then worked up as in Example I. The yield of chloromethylated toluene was 11.5 grams.

Three grams of the chloromethylated toluene was oxidized by potassium permanganate as in Example I. The yield of terephthalic acid was 1.2 grams and that of orthophthalic acid was 0.9 gram. The ratio of ortho to para isomer was 0.75.

*Example IV*

Another experiment was carried out similarly to Example I except that 67.5 grams of sulfuryl chloride (0.5 mole) was added dropwise in place of the sulfur monochloride over a period of 60 minutes while the temperature ranged from 73° to 80° C. The stirring was continued for another 17 minutes. The reaction products were cooled and worked up as in Example I. The yield of chloromethylated toluene was 9.8 grams. When 3 grams of the chloromethylated toluene were oxidized as in Example I, 0.9 gram of terephthalic acid and 1.0 gram of orthophthalic acid were obtained. The ratio of ortho to para isomer was 1.1.

Other starting materials for the reaction to prepare the halomethylated products comprise any complex, polynuclear, and/or heterocyclic aromatic compound from petroleum sources. A preferred and unique source of aromatic starting material comprises petroleum fractions as herein defined, not only because the halomethylated products therefrom have unique properties, but also because the techniques outlined herein are particularly adapted to processing these more complex and chemically resistant source materials. Illustrating the preferred and novel starting materials is the class known as solvent extracts from the manufacture of mineral lubricating oils, which solvent extracts are rich in complex, polynuclear, aryl, alkaryl, condensed ring and heterocyclic compounds forming the organic portion of the halomethylated derivatives of this invention. Solvent extracts from the manufacture of bright stock and neutral lubricating oils are particular examples of such fractions, rich in complex aromatic compounds, obtained as by-products from the solvent refining of mineral oils.

For example, a preferred source of the above-defined complex hydrocarbons comprises the solvent extracts obtained in the solvent refining of mineral oils, particularly lubricating oil fractions, using a solvent selective for aromatic compounds. These extracts, hereinafter referred to as solvent extracts, are obtained as the extract or solvent phase when lubricating oils are refined by treatment with said selective solvent having an affinity for the aromatic compounds.

Since the general process of refining mineral lubricating oils in which solvent extracts are obtained is well known, it is only necessary for present purposes to give some examples by way of illustration. Following are the physical characteristics of typical extract products, from lubricating oil stocks derived from various crude oils, which may be chloromethylated by the process of this invention.

| Substituted phenanthrenes | 10.0 |
| Substituted anthracenes | 5.0 |
| Tetranuclear aromatics: | |
|   Substituted chrysenes | 0.5 |
|   Substituted benzphenanthrenes | 0.2 |
|   Substituted pyrenes | 0.2 |
| Pentanuclear aromatics: Perylene | 0.01 |
| Sulfur compounds,[2] oxygen compounds, etc. | 16.5 |

[1] The average mol. wt. of Extracts 43 and 44 is 340.
[2] Mainly heterocyclic compounds.

TABLE I.—SOURCES AND PHYSICAL CHARACTERISTICS OF SOLVENT EXTRACTS

| Ext. No. | Crude Source | Solvent | API Grav. | Sp. Gr. at 10° F. | Vis./100° F. | Vis./130° F. | Vis./210° F. | V.I. | Pour | ° F. Flash | ° F. Fire | Iodine No. (Wijs) | Percent C.R. | Percent Sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.60 |
| 2 | do | do | 15.4 | | 15,000 | | 285 | +39 | | | | | | |
| 3 | do | do | 12.6 | | 36,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.2 |
| 5 | do | do | 15.4 | | 32,500 | | 372 | +5 | +60 | | | | 4.13 | 2.33 |
| 6 | do | do | 13.7 | | 25,000 | 5,400 | 355 | +27 | +80 | | | | | 2.18 |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | 2.18 |
| 9 | Santa Fe Springs | do | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.4 | | |
| 11 | Penn | Chlorex | 12.2 | 0.9843 | | | 1,365 | | +85 | 560 | 630 | 71.4 | | |
| 12 | Penn | Nitrobenzene | 10.0 | 1.000 | | | 1,500 | | +75 | 555 | 640 | 60 | | |
| 13 | Mid-Cont | Propane cresol | 14.4 | 0.9699 | | | 1,500 | | +100 | 540 | 605 | 63.7 | | |
| 14 | Mid-Cont | Phenol | 13.6 | | | | 41.7 | −82 | +20 | | | | | |
| 15 | Mid-Cont | Chlorex | 13.6 | | | | 200 | −61 | +75 | | | | | |
| 16 | Mid-Cont | Phenol | 8.9 | | | | 569 | | +75 | | | | | |
| 17 | Mid-Cont | Furfural | 14.9 | | | | 50.2 | 25 | +20 | | | | | |
| 18 | East Tex | Phenol | 13.5 | .976 | 25,600 | | 341 | 17 | +65 | 580 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.7 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 41 | do | do | 17.6 | | | 154 | 80 | 11 | +30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,007 | 611 | 71.1 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of 85 Vis. neutral, has an average molecular weight of 300, and contained 76.8% aromatics (by the silica gel procedure).

Extract No. 42 was obtained in the production of 150 Vis. Bright Stock, has an average molecular weight of 590, contained 86% aromatics, 14% saturates, analyzed 86.2% carbon, 11.4% hydrogen and averaged 3.3 aromatic rings per aromatic molecule.

Extract No. 43 was obtained in the production of 170 Vis. neutral, has an average molecular weight of 340, contained 84.1% aromatics, 15.9% saturates, analyzed 86.4% carbon, 10.7% hydrogen, and averaged 2.7 aromatic rings per aromatic molecule.

Extract No. 44 was obtained in the production of 200 Vis. neutral, has an average molecular weight of 340 and contained 87% aromatics and 13% saturates.

Extract No. 45 was obtained in the production of 160 Vis. Bright Stock and contained 92% aromatics and 8% saturates.

The solvent extracts, from lubricating oil stocks, used as the starting materials for this invention, have the following general properties and characteristics.

TABLE II

Characteristic:                         Range of value
- Gravity, ° API — 7.3–17.6
- Gravity, sp., 60/60 ° F. — 0.949–1.020
- Viscosity, SUS @ 210° F. — 41–1500
- Viscosity index — −128–+39
- Pour point (max.) ° F. — +20–+100
- Molecular weight, average — 320–750
- Boiling point (initial), ° F. — 550 minimum
- Boiling point (end), ° F. — 700 minimum
- Sulfur, percent wt. (total) — Above 0.5
- Sulfur compounds,[1] percent by vol. — 10–50
- Aromatic hydrocarbons, percent by vol. — 25–90
- Av. No. of rings/mean arom. mol. — 1.7–5.0

[1] Principally heterocyclic compounds.

The complexity of the mixture of compounds present, as based an analysis, is illustrated by the following table:

TABLE III.—ESTIMATED CHEMICAL COMPOSITION[1] OF SOLVENT EXTRACTS NOS. 43 AND 44 OF TABLE I

Type of compound:     Approx. percent in the extract
- Saturated hydrocarbons — 12.5
- Mononuclear aromatics: Substituted benzenes — 25.0
- Dinuclear aromatics: Substituted naphthalenes — 30.0
- Trinuclear aromatics:

Any portion of the reactive aromatic constituents in solvent extracts may be isolated therefrom, or from other sources, to be used as starting materials for the reaction in accordance with this invention. For example, solvent extracts may be distilled and selected fractions thereof used as the starting materials. The content of reactive, complex, polynuclear, aromatic compounds and heterocyclics present in solvent extracts, as illustrating a preferred source material, may vary depending on the type of solvent, the extraction process applied, and the mineral oil treated, although the general types of compounds present in the extract are not so varied. Extracts containing from about 30% to 90% of polynuclear aromatics and heterocyclics of aromatic nature represent a preferred type of starting material for economic reasons.

The solvent extract starting material may be vacuum-distilled, dewaxed and/or clay-contacted prior to chloromethylation according to the process of this invention. Dewaxing can be accomplished by known methods, e.g. treatment with a mixture of 45% methyl ethyl ketone and 55% toluene as the dewaxing solvent, using temperatures in the order of −10° F. and solvent/solvent extract ratios of about 8/1. Clay-contacting can be accomplished by known methods.

Although the invention has been described by reference to specific embodiments these are not to be considered as limiting. Although about 1 mole of the aromatic starting material reacts with about 1 mole of formaldehyde and about 1 mole of sulfur monochloride (to illustrate), any amount of the aromatic starting material may be used. Large excesses of the aromatic starting material e.g. 10% to 100% can be used, particularly where the aromatic starting material can act as a solvent for the reactants. As is known in the art, substituent on the aromatic ring or rings may be ortho, meta, or para directing to subsequent halomethyl groups placed thereon. If only one substituent is already present on the aromatic starting material, i.e. an alkyl group ($CH_3$—), hydroxyl, or phenyl, then halomethylation takes place at the para position thereto, generally. A carboxyl group would be meta directing. All meta-directing groups tend to slow up the reaction and the presence of ortho or para-directing groups, in mixed substituents tend to over-shadow the meta-directing groups. A preferred group of starting materials to be used in accordance with the invention comprises benzene, toluene, o-xylene, m-xylene, p-xylene, ethylbenzene fractions obtained from the alkylation of benzene with propylene tetramer and solvent extracts obtained in the solvent extraction of mineral lubricating oils with a solvent selective for aromatic compounds.

In addition to formaldehyde, paraformaldehyde and s-trioxane, alkanals in general can be used such as acetaldehyde, butyraldehyde and like aldehydes but the resulting haloalkylated product has the corresponding alkyl substituent therefrom attached to the carbon atom holding the halogen. Chloroethylation can be accomplished in accordance with this invention by using paraldehyde ($CH_3CHO$) or chloroacetaldehyde. Chloropropylation and chlorobutylation are accomplished with propionaldehyde and butyraldehyde. Thus the process can be used to transform anisole to $\alpha,\beta$-dichloroethylanisole. The carbon chain containing the halogen in the product can have up to 20 carbon atoms. The use of more than 1 mol of alkanal per mol of aromatic starting material may result in disubstitution, which may or may not be desired, and may be wasteful of this reactant. Mixtures of various alkanals can be used. Aqueous soltions of formaldehyde (formalin) cannot be used and the reaction is essentially anhydrous, there being no more than about 1.0% by wt., based on total reactants, of water present. Similarly the use of more than ½ mol of the halide or oxyhalide of sulfur results in waste of the exess. If 4 to 5 mols are used difficulties may be encountered in product purification.

The haloacid can be omitted from the reaction. Since the haloacid acts as a catalyst, it is best to use at least about 0.1 mole per mole of aromatic hydrocarbon reacting. In general about 0.5 to 0.2 mole of the haloacid can be used and preferably it is present in excess, being bubbled through the reaction mixture. The reaction of this invention can be carried out at a temperature in the range of about 50° C. to 150° C. Preferably the temperature is maintained within about 10° C. of the range of 60° to 85° C. during the reaction for best results.

A wide variety of known oxidation conditions and oxidants can be used to transform the haloalkylated products of this invention into useful acids. Thus nitric acid at about 100° C. can be used. The end point of this reaction is determined by cessation of fuming. Alkaline, neutral or acid permanganates, e.g. potassium permanganate, can be used under reflux conditions. The known methods of applying potassium or sodium dichromate and sulfuric acid solutions can be used. Similarly manganese dioxide in dilute sulfuric acid or chlorates with a haloacid can be used to accomplish the oxidation of the haloalkyl group or groups to the carboxyl groups.

The embodiments of this invention in which an exclusive property or privilege is claimed are defined as follows:

1. The process of preparing chloroalkylated derivatives of a member of the group consisting of benzene, toluene, o-xylene, m-xylene, p-xylene, ethylbenzene fractions from the alkylation of benzene with propylene tetramer and solvent extracts obtained in the solvent extraction of mineral lubricating oils with a solvent selective for aromatic compounds, which comprises heating at least one of said members with an alkanal of the group consisting of formaldehyde, paraldehyde, paraformaldehyde, s-trioxane, acetaldehyde, butyraldehyde, chloroacetaldehyde, propionaldehyde, and mixtures thereof, in the presence of a hydrohalide of the group consisting of hydrogen chloride, hydrogen iodide and hydrogen bromide, and a sulfur-chlorine compound of the group consisting of sulfur monochloride, sulfur dichloride, thionyl chloride and sulfuryl chloride, under essentially anhydrous conditions and at a temperature of about 50° to 150° C., the reaction mixture containing about 0.5 mole of said sulfur-chlorine compond per mole of said member and per monomer unit of said alkanal, and recovering said chloroalkylated derivatives therefrom.

2. The process in accordance with claim 1 in which said member is benzene.

3. The process in accordance with claim 1 in which said member is toluene.

4. The process in accordance with claim 1 in which said member is toluene and said alkanal is paraformaldehyde.

5. The process in accordance with claim 1 in which said member is toluene, said alkanal is paraformaldehyde and said sulfur-chlorine compound is sulfur monochloride.

6. The process in accordance with claim 1 in which said member is toluene, said alkanal is paraformaldehyde, and said sulfur-chlorine compound is thionyl chloride.

7. The process in accordance with claim 1 in which said member is toluene, said alkanal is paraformaldehyde and said sulfur-chlorine compound is sulfuryl chloride.

8. The process in accordance with claim 1 in which said alkanal is paraformaldehyde.

9. The process of preparing chloromethylated toluene which comprises reacting toluene with paraformaldehyde and a sulfur-chlorine compound of the group consisting of sulfur monochloride, sulfur dichloride, thionyl chloride and sulfuryl chloride at a temperature of about 60° to 85° C. in the presence of hydrogen chloride, and under essentially anhydrous conditions, wherein the reaction mixture contains about 0.5 mole of said sulfur-chlorine compound per mole of toluene and per monomer unit of said paraformaldehyde and recovering chloromethylated toluene from the reaction mixture.

References Cited by the Examiner

UNITED STATES PATENTS 2,630,459 3/1953 Raterink _____ 260—651
2,846,480 8/1958 McClaffin et al. _____ 260—651
2,966,514 12/1960 Benning et al. _____ 260—524

OTHER REFERENCES

Okuschi et al., Chemical Abstracts, 55, col. 1, 23,456 (1961).

Adams et al., Organic Reactions, vol. I, pp. 63–74 (1942).

Remy, Treatise on Inorganic Chemistry, vol. I, pp. 727–31 (1956).

LORRAINE A. WEINBERGER, *Primary Examiner.*

LEON ZITVER, *Examiner.*

M. S. JAROSZ, L. A. THAXTON, *Assistant Examiners.*